US011431590B2

(12) United States Patent
Peterson et al.

(10) Patent No.: US 11,431,590 B2
(45) Date of Patent: Aug. 30, 2022

(54) METHOD AND DEVICE TO UPDATE CONTACTS

(71) Applicant: Lenovo (Singapore) Pte. Ltd., Singapore (SG)

(72) Inventors: Nathan J. Peterson, Durham, NC (US); John Carl Mese, Cary, NC (US); Russell Speight VanBlon, Raleigh, NC (US); Arnold S. Weksler, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 858 days.

(21) Appl. No.: 14/572,449

(22) Filed: Dec. 16, 2014

(65) Prior Publication Data

US 2016/0173346 A1    Jun. 16, 2016

(51) Int. Cl.
| | |
|---|---|
| *H04L 61/4594* | (2022.01) |
| *H04L 43/045* | (2022.01) |
| *H04L 43/10* | (2022.01) |
| *H04L 51/48* | (2022.01) |
| *H04L 101/37* | (2022.01) |

(52) U.S. Cl.
CPC .......... *H04L 43/045* (2013.01); *H04L 43/10* (2013.01); *H04L 51/48* (2022.05); *H04L 61/4594* (2022.05); *H04L 2101/37* (2022.05)

(58) Field of Classification Search
USPC ....................................................... 709/224
See application file for complete search history.

(56) References Cited

U.S. PATENT DOCUMENTS

| 7,096,255 B2* | 8/2006 | Malik ................... H04L 12/581 707/999.001 |
| 2006/0035632 A1 | 2/2006 | Sovari et al. |
| 2007/0067439 A1* | 3/2007 | Mason ................... H04L 51/04 709/224 |

(Continued)

OTHER PUBLICATIONS

Examination Report for corresponding DE Application No. 10 2015 122 028.8 dated Jan. 21, 2019 (6 pages).

(Continued)

*Primary Examiner* — Glenford J Madamba
(74) *Attorney, Agent, or Firm* — The Small Patent Law Group LLC; Dean D. Small

(57) ABSTRACT

Methods, devices and program products are provided to track communications event (CE) identifiers associated with the communications events for a device. The method determines whether communications events are associated with a common CE identifier, and performs a contact update utilizing content from at least one communications event associated with the common CE identifier to update a contact. The device comprises a processor, a user interface, and a local storage medium. The device determines whether communications events are associated with a common CE identifier and performs a contact update utilizing content from at least one of the communications events associated with the common CE identifier to update the contact. The computer program product comprises a non-signal computer readable storage medium comprising computer executable code to track CE identifiers associated with the communications events for a device and a contact update.

15 Claims, 6 Drawing Sheets

(56) References Cited

U.S. PATENT DOCUMENTS

| | | | |
|---|---|---|---|
| 2009/0112804 A1* | 4/2009 | Quiroz-Castro | G06F 16/2322 |
| 2010/0094837 A1* | 4/2010 | O'Sullivan | G06Q 10/107 |
| | | | 707/705 |
| 2010/0144331 A1* | 6/2010 | Koberg | H04M 1/274583 |
| | | | 455/418 |
| 2011/0151850 A1* | 6/2011 | Haaparanta | 455/415 |
| 2012/0063585 A1 | 3/2012 | Gravino et al. | |
| 2014/0025766 A1* | 1/2014 | Beck | G06Q 10/107 |
| | | | 709/206 |
| 2015/0100580 A1* | 4/2015 | Mathur | G06Q 10/107 |
| | | | 707/737 |

OTHER PUBLICATIONS

Examination Report for corresponding DE Application No. 10 2015 122 028.8 dated Jul. 24, 2019 (4 pages).

* cited by examiner

METHOD AND DEVICE TO UPDATE CONTACTS

BACKGROUND

Embodiments of the present disclosure generally relate to contact management in connection with communications events for devices.

Today, portable and desktop devices offer various software applications that enable users to maintain contacts (e.g. an electronic address book) of the user. The user is afforded the option to enter various types of information regarding each individual contact, including various types of address information (e.g. phone number, email address, physical address).

However, existing contact management software affords limited mechanisms for entering new contacts and modifying existing contacts. For example, the user may be required to manually enter the information into each field of the contact. Alternatively, when an electronic business card is received by email, the user may enter the electronic business card into the users contact list. Although, every individual does not send electronic business cards with email. Also, when communicating through text or by phone, there is no readily available way to transfer an electronic business card (other than through email).

Further, users may only intend to communicate with a particular individual for a limited period of time, such as in connection with home-improvement projects, limited business transactions and the like. When the interaction with an individual is expected to end in the near future, often users elect not to create a contact for the individual as the time/difficulty to create the contact out weights the benefit from the limited useful life of the contact. Hence, for the temporary period of time in which a user communicates with the individual, the user forgoes the benefits and convenience of using a contact to initiate communications events (e.g., send an email or text message, make a phone call and the like).

SUMMARY

In accordance with an embodiment, a method is provided which comprises tracking communications event (CE) identifiers associated with the communications events for a device. The CE identifiers indicate at least one of a source or destination of the corresponding communications event. The method determines whether a select number of communications events are associated with a common CE identifier. The method also performs a contact update based on the determining. The contact update utilizes content from at least one of the communications events associated with the common CE identifier to update a contact.

Optionally, the CE identifiers indicate a source for communications events received by the device and a destination for communications events sent from the device. Optionally, the contact update utilizes the content to at least one of generate a new contact or update an existing contact. Optionally, the method may include generating, as the contact update, a temporary contact on the device based on the content of the communications events associated with the common CE identifier.

Additionally or alternatively, the method may further comprise presenting an update-contact option, through a user interface of the device, to perform the contact update. Optionally, the method may comprise analyzing the content to identify at least one of a telephone number, email address, home address, business address, and/or name associated with the at least one of the source and/or destination of the corresponding communications event. Optionally, the method may further comprise presenting a temporary contact option, through the user interface of the device, to designate the new or existing contact as a temporary contact.

In accordance with an embodiment, a device is provided that comprises a processor, a user interface generated via the processor, and a local storage medium storing program instructions accessible by the processor. Responsive to execution of the program instructions, the processor tracks communications event (CE) identifiers associated with the communications events for a device. The device determines whether a select number of communications events are associated with a common CE identifier. The device also performs a contact update based on the operation. The contact update utilizes content from at least one of the communications events associated with the common CE identifier to update a contact.

In accordance with an embodiment, a computer program product is provided, which comprises a non-signal computer readable storage medium comprising computer executable code. The code tracks communications event (CE) identifiers associated with the communications events for a device. The code determines whether a select number of communications events are associated with a common CE identifier, and the code performs a contact update based on the determining. The contact update utilizes content from at least one of the communications events associated with the common CE identifier to update a contact.

DETAILED DESCRIPTION

Figure 1:
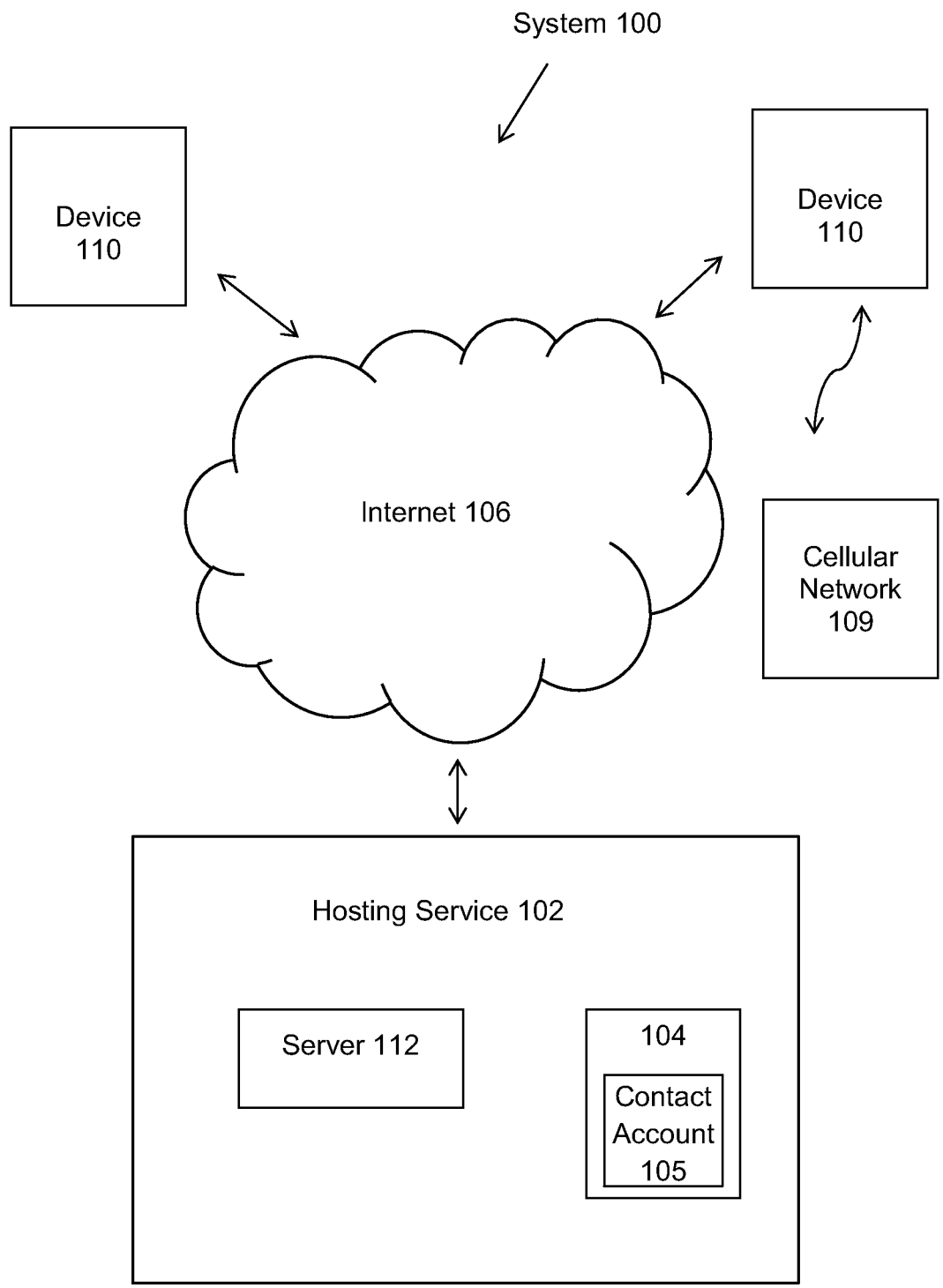
FIG. 1 illustrates a system that tracks communications events between devices and facilitates creation or modification to contacts in relation thereto in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "contact" includes, but is not limited to, a file or collection of information identifying an individual source or destination with which a communications event may occur. By way of a non-limiting example, a contact may include one or more phone numbers, email addresses, individual/business names, and/or any other identification information uniquely associated with a source/destination for communications events. The source and/or destination may represent one or more devices, an individual, a group, a business, an association and the like. The contact may also include additional information, such as information regarding the source/destination (e.g. family names, history, notes, etc.). The contact may include alphanumeric text, audio files, video files, photographs, hypertext links and the like.

The terms "contact collection" and "contact account" refer to a group of one or more contacts that are maintained by a contact management software package in connection with, and/or stored together, as a common account, such as for an individual user, business, association, group and the like.

The terms "update" and "contact update" include both creating/adding a new contact and modifying an existing contact within a contact collection or contact account of a contact management software package.

The terms "communications content" and "communications content element", as used throughout, shall generally refer to any and all textual, audio or video information or data conveyed to or from a device during a communications event. The communications content may be as simple as a telephone number for an incoming or outgoing phone call, or may be more extensive, such as the complete data content (including addressing headers) for an individual or string of email messages, text messages and the like. The communications content may include notes, task information, text messages, email messages, picture(s), audio, video and media files. The terms "communications content element" and "content element" refer to a single task, note, text message, email message, picture, audio file or video file. The term "communications content" may include one or more content elements.

FIG. 1 illustrates a system 100 that tracks communications events between devices and facilitates creation or modification to contacts in relation thereto. The system 100 includes one or more electronic devices 110 that communicate through various communications medium such as over the Internet 106, a cellular network 109 and the like. The devices 110 may represent computing devices, electronic devices and/or other types of devices that perform the operations described herein.

A hosting service 102 may include one or more remote storage medium (also referred to as cloud storage) 104 that are operatively coupled to one or more servers 112. The servers 112 manage communication between devices 110 and between users, where the communications occur over a cellular network, the Internet 106 or other network configured to convey communications content. The hosting service 102 performs various operations in connection with establishing and maintaining communications events between devices 110, as well as maintaining one or more contact accounts 105 associated with a user and/or one or more devices 110 in connection with a contact management software package.

The users of the devices 110 may have one or more contact account 105 maintained at the hosting service 102. The contact account 105 may be shared with one or more devices 110. The devices 110 may store, in memory therein, a duplicate copy of the contact account 105, which is synchronized periodically with the contact account 105 held at the remote storage medium 104. Once a contact file associated with an individual contact, within the contact account 105, is uploaded to a shared folder on the hosting service 102, anyone (or any device 110) with permission may be granted access to the contact file. For example, the hosting service 102 may represent one or more of various existing services, such as the Google Drive™ file storage and synchronization service, the Dropbox™ file storage and synchronization service, the SkyDrive™ file storage and synchronization service and the like.

As explained in accordance with embodiments herein, the server 112 and/or devices 110 tracks communications events (CE) in which communications content is passed to and from various devices 110 in order to identify potential or candidate contact updates. A potential or candidate contact update may represent a new contact to be added to the contact account 105 or a modification to an existing contact within the contact account 105.

Figure 2A:
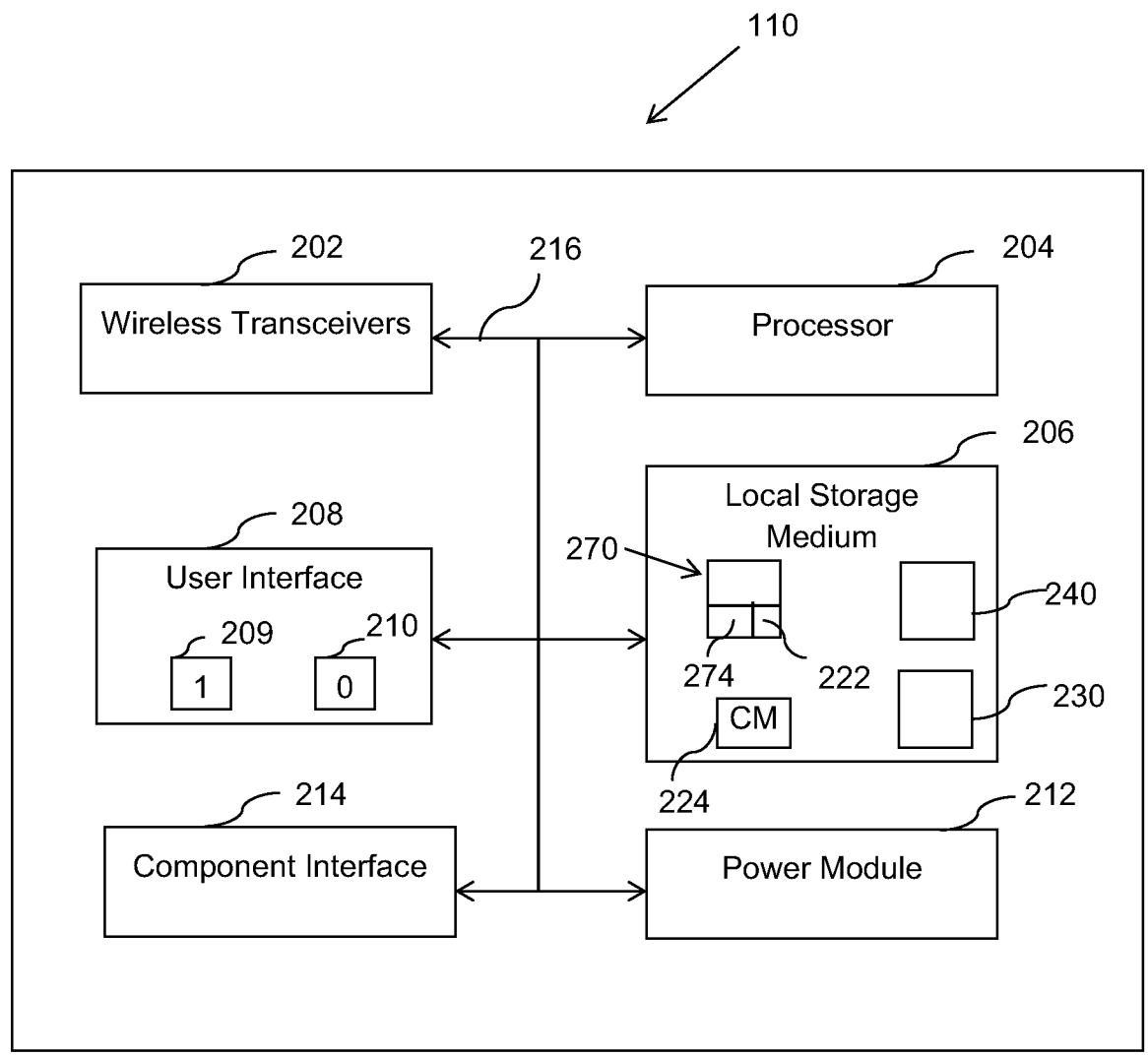
FIG. 2A illustrates a simplified block diagram of the device in accordance with embodiments herein.

FIG. 2A illustrates a simplified block diagram of the device 110, which includes components such as one or more wireless transceivers 202, one or more processors 204 (e.g., a microprocessor, microcomputer, application-specific integrated circuit, etc.), one or more local storage medium (also referred to as a memory portion) 206, a user interface 208 generated via the processors 204. The user interface 208 includes one or more input devices 209 and one or more output devices 210, a power module 212, and a component interface 214. All of these components can be operatively coupled to one another, and can be in communication with one another, by way of one or more internal communication links 216, such as an internal bus.

The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 210 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 210 may include a touch sensitive screen, a non-touch sensitive screen, a text-only display, a smart phone display, an audio output (e.g., a speaker or headphone jack), and/or any combination thereof.

The user interface 208 permits the user to select one or more of a switch, button or icon in connection with various operations of the device 110. By way of example only, the user interface 208 may be used to initiate an outgoing communications event, accept an incoming communications event, agree (when prompted) to add/create a new contact, agree (when prompted) to modify an existing contact and the like. The user interface 208 may also be used to create communications content in connection with outgoing communications events. The user interface 208 may also be used to designate a new contact to represent a temporary contact and/or to enter term indicators associated with the life of the temporary contact, including one or both of temporal and location lifetime markers. As one example, when receiving an incoming communications event, the user may open a text message or email message, after which the device 110 may prompt the user as to whether the user wishes to create a new contact related to the source of the incoming text or email message. As another example, when a user completes a phone call (e.g. incoming or outgoing phone call), the device 110 may prompt the user as to whether the user wishes to create a new contact related to the source/destination of the phone call and mark the contact as temporary or permanent. The user may enter an input indicating a desire to create the new contact (or update an existing contact) in response to various prompts through entry from soft keys, hard keys, voice commands and otherwise. Optionally, the user interface may provide a separate contact update soft button or icon for the user to select when the user desires to update a contact associated with the communications event.

Optionally, the user may enter an indication to update a contact (e.g. create a new contact or modify an existing contact) without any prior prompt from the device. For example, a user may select a text message or email message, and the user may select a contact update button on the user interface 209, thereby instructing the device 110 to both open communications content and to use information within the communications content to add or update a contact in connection there with. The user may select a temporary contact indicator on the user interface 209 thereby marking the contact updated in connection with the communications content as temporary.

Optionally, to differentiate between an update of permanent and temporary contacts, the user may hold down a contact update button for a predetermined extended period of time (e.g., 2-5 seconds, 2 or more seconds, etc.) longer than a standard period of time associated with collection of non-temporary contacts (e.g., less than 2 second). When the contact update button is held down for a predetermined longer extended period of time, the input is interpreted as an indication to create a temporary contact.

As another example, the user may enter one or more predefined touch gestures and/or voice commands through a microphone on the device 110. The predefined touch gestures and/or voice commands may instruct the device 110 to update a contact and/or mark a contact as temporary with a temporal lifetime marker (e.g., a termination date, a period of time to maintain the temporary contact) and/or a location lifetime marker.

The local storage medium 206 can encompass one or more memory devices of any of a variety of forms (e.g., read only memory, random access memory, static random access memory, dynamic random access memory, etc.) and can be used by the processor 204 to store and retrieve data. The data that is stored by the local storage medium 206 can include, but need not be limited to, operating systems, applications, contacts, contact collections, contact accounts, communications content and other information. Each operating system includes executable code that controls basic functions of the communication device, such as interaction among the various components, communication with external devices via the wireless transceivers 202 and/or the component interface 214, and storage and retrieval of applications and data to and from the local storage medium 206. Each application includes executable code that utilizes an operating system to provide more specific functionality for the communication devices, such as file system service and handling of protected and unprotected data stored in the local storage medium 206.

As explained herein, the local storage medium 206 stores communications content 240 temporary and non-temporary contacts in a contact account 270 saved in common or separate memory sections. The temporary contacts 274 have term indicators 222 stored in connection therewith. As explained herein, the term indicators 222 designate a contact to represent a temporary contact 274. The term indicators 222 may include or exclude lifetime markers designating when (or under what circumstances) the associated temporary contact 274 is to be deleted from the local storage medium 206. For example, the lifetime markers may be location-based, time-based or otherwise.

Other applications stored in the local storage medium 206 include various application program interfaces (APIs), some of which provide links to/from the cloud hosting service 102. The power module 212 preferably includes a power supply, such as a battery, for providing power to the other components while enabling the device 110 to be portable, as well as circuitry providing for the battery to be recharged. The component interface 214 provides a direct connection to other devices, auxiliary components, or accessories for additional or enhanced functionality, and in particular, can include a USB port for linking to a user device with a USB cable.

Each transceiver 202 can utilize a known wireless technology for communication. Exemplary operation of the wireless transceivers 202 in conjunction with other components of the device 110 may take a variety of forms and may include, for example, operation in which, upon reception of wireless signals, the components of device 110 detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 210. Likewise, for transmission of wireless signals, the processor 204 formats outgoing information, and conveys the outgoing information to one or more of the wireless transceivers 202 for modulation to communication signals. The wireless transceiver(s) 202 convey the modulated signals to a remote device, such as a cell tower or a remote server (not shown).

Additionally, the applications stored in the local storage medium 206 include a contact management (CM) application 224 for facilitating the management of contacts, communications content, CE identifiers, and operation of the device 110 in order to allow a user to read, create, edit, delete, organize or otherwise manage the contacts and communications content, as well as to configure device settings in connection therewith. The CM application 224 may be activated by default upon start-up of the device 110, and/or may be activated or disabled via input devices 209 of the user interface 208. In one embodiment, the CM application 224 may be activated when one or more other applications are opened/activated on the device 110, such as when opening a text messaging application, an email management application, a telephone communications application and the like. The CM application 224 includes program instructions accessible by the one or more processors 204 to direct a processor 204 to implement the methods, processes and operations described herein including, but not limited to the methods, processes and operations illustrated in the Figures and described in connection with the Figures.

The CM application 224 includes one or more modules that operate in connection the various functions and features as described herein. By way of example, the CM application 224 may include software modules that include a CE tracking module 250, a CE ID log management module 252 and a contact update module 254 as described herein in more detail in connection with FIG. 2B and elsewhere.

Figure 2B:
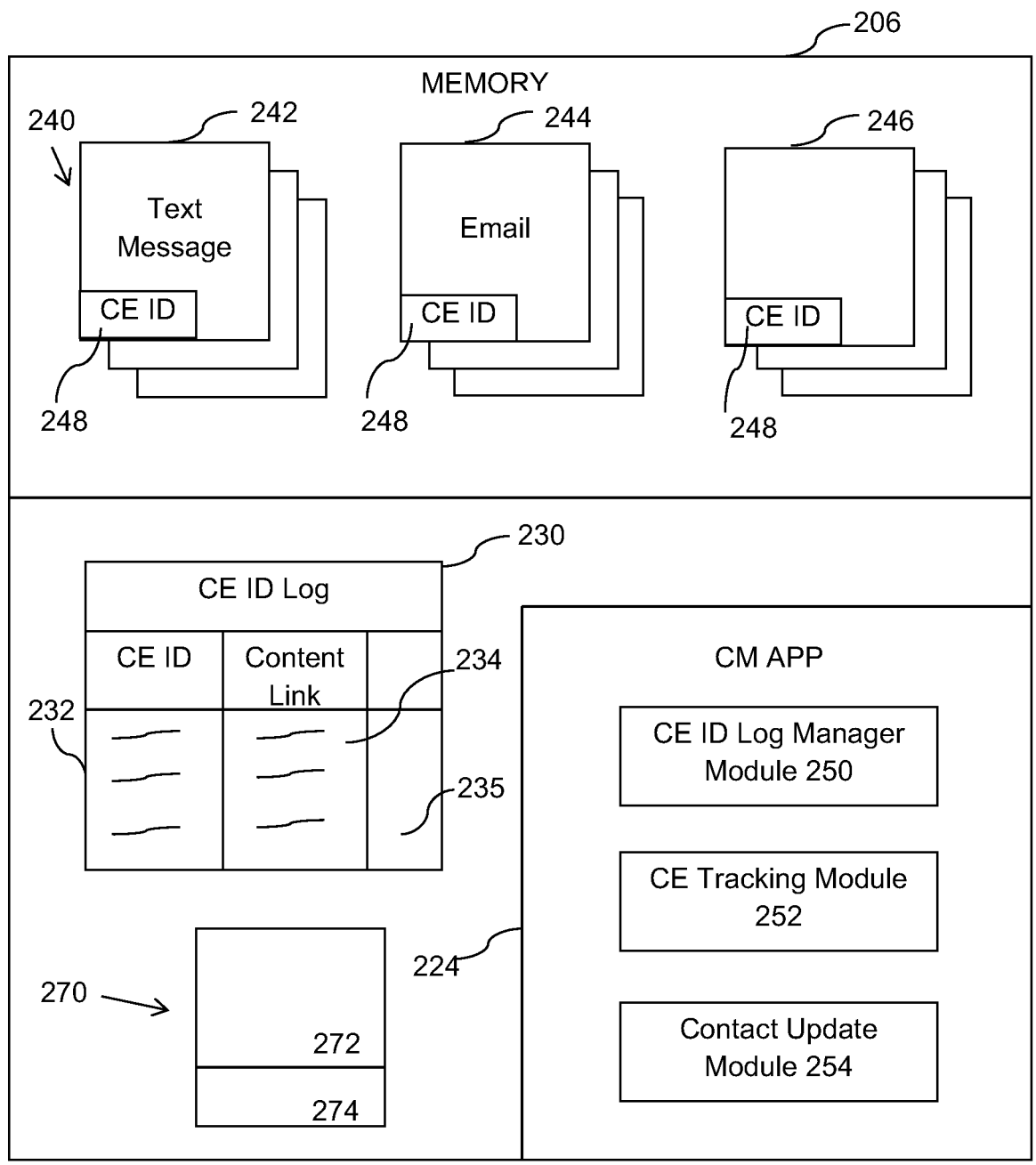
FIG. 2B illustrates a block diagram of portions of the contacts, content, data and modules that may be stored within the memory in accordance with embodiments herein.

FIG. 2B illustrates a block diagram of portions of the contacts, content, data and modules that may be stored within the memory 206 and/or within the memory 104 in accordance with embodiments herein. The memory 206 stores a contact collection 270 which may be separated into temporary contacts 274 and permanent, non-temporary contacts 272. Temporary contacts 274 include an indicator denoting a lifetime marker associated with the temporary contact 274, such as a time-based indicator or a geographic location-based indicator or otherwise. As explained herein, temporary contacts 274 are deleted, from the local storage medium 206, after expiration of the lifetime marker. The permanent, non-temporary contacts 272 may be maintained within the contact collection 270 indefinitely until deleted or modified by the user.

The memory 206 stores various types of content elements (generally denoted at 240), such as text messages 242, email messages 244, phone logs 246 and the like. The content elements 240 include at least one of incoming communications (IC) content received by a device or outgoing communications (OC) content sent from the device. The content element 240 associated with each communications event has a corresponding CE identifier. In the example of FIG. 2B, CE identifiers 248 are denoted in connection with each of the text messages 242, email messages 244 and phone logs 246. The memory 206 also stores the CE ID log 230 which maintains a list 232 of CE identifiers associated with incoming and/or outgoing communications events and a count 235 of the number of times CE identifier has been used. Each CE identifier on the list 232 is associated with a corresponding content element 240 (e.g. text message, email message, phone log, etc.), where links 234 correlate each CE identifier on the list 232 with the corresponding content element 240. The count 235 for each CE identifier may be for select period of time.

The CM module 224 includes a CE tracking module 250, a CE ID log manager module 252 and a contact update module 254. The CE tracking module 250 tracks CE identifiers associated with the communications events for one or more devices 110. The CE identifiers indicate objects associated with the corresponding communications events. For example, the objects may include or represent a source for communications events received by the devices 110 and/or destinations for communications events sent from the devices 110. By way of example, the CE tracking module 250 may analyze each content element to identify at least one of a telephone number, email address, home address, business address, and/or name associated with the corresponding communications event.

The CE ID log manager module 252 increments the count 235 associated with a CE identifier each time a new CE is tracked. The CE ID log manager module 252 determines when the count indicates that a select number of communications events are associated with a common CE identifier.

The contact update module 254 performs contact updates based on the determination by the CE ID log manager module 252. The contact update module 254 utilizes the communications content from at least one of the communications events associated with the common CE identifier to at least one of generate a new contact or update an existing contact. Additionally or alternatively, the contact update module 254 may present an update-contact option, through a user interface of the device, to perform the contact update. The user may select an option to add or modify a temporary or permanent contact. By way of example, the contact update module 254 may generate, as the contact update, a temporary contact on the device based on the content of the communications events associated with the common CE identifier.

Optionally, the contact update module 254 may present a temporary contact option, through the user interface of the device, to designate the new or existing contact as a temporary contact. The module 254 may automatically delete the temporary contact after an occurrence of an indicator, where the indicator represents at least one of expiration of a select amount of time or a predetermined amount of time passing without using the temporary contact. For example, the temporary contact may be stored in the local storage medium 206 local to the device 110, and the module 254 deletes the temporary contact, from the local storage medium 206, based on the indicator.

Specific reference will now be made here below to FIGS. 3-5. It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Figure 3:
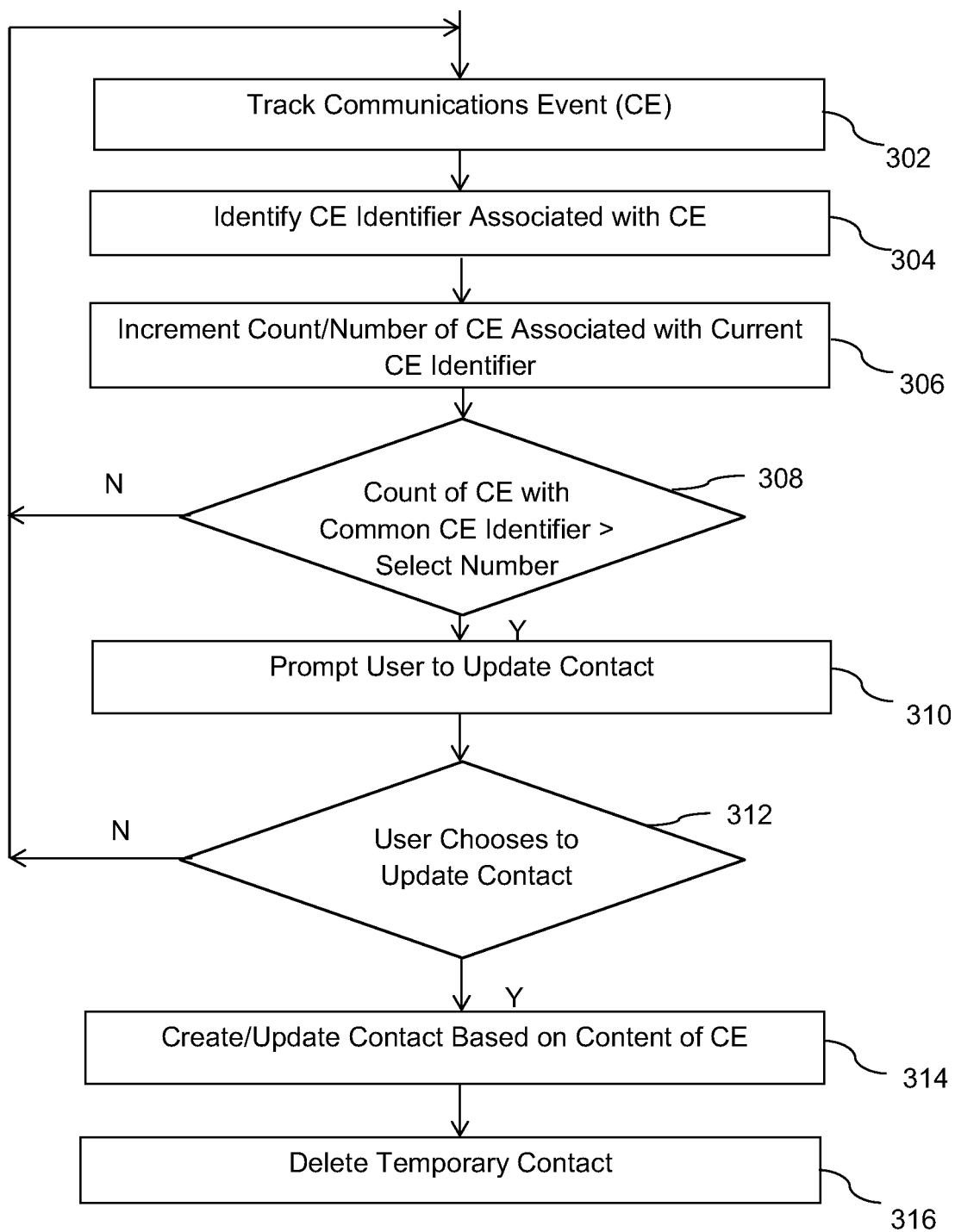
FIG. 3 illustrates a process carried out in accordance with embodiments for creating new contacts and modifying existing contacts in connection with a select contact account or contact collection.

FIG. 3 illustrates a process carried out in accordance with embodiments for creating new contacts and modifying existing contacts in connection with a select contact account or contact collection 270 (FIG. 2B). The operations of FIG. 3 are carried out by one or more processors 204 of the device 110 in response to execution of program instructions, such as in the CM application 224, and/or other applications stored in the local storage medium 206. Additionally or alternatively, the operations of FIG. 3 may be carried out by the processors within one or more servers 112 in response to execution of program instructions, such as in the CM application 224 stored at the server, and/or other applications stored at the server. The contact collection 270 may represent the contacts maintained i) on a single device, ii) in connection with a single user's account on a network, iii) in connection with one or more contact accounts maintained on one or more devices for a common user, iv) in connection with one or more contact accounts maintained by a business, association or other group, or otherwise.

At 302, the processor tracks a communications event (CE) that is directed to or sent from one or more devices 110. Optionally, the processor may track a CE that is associated with a select user account that has a corresponding contact collection. The CE may represent an incoming or outgoing text message, email message, FaceTime call, audio call or any other type of communication. The communications event includes communications content. Non-limiting examples of communications content include an incoming or outgoing text message, email message, request to initiate a FaceTime call, request to initiate an audio call and the like.

At 304, a CE identifier is identified in connection with the CE from the communications content. The communications content associated with each communications event includes a CE identifier as well as other content, such as alphanumeric textual content, graphical content, audio/video content and the like. The communications content represents at least one of incoming communications content received by a device 110 or outgoing communications content sent from the device 110. The processor packs, unpacks or otherwise analyzes the communications content for each communications event in order to identify the CE identifier therein. The CE identifier may represent a unique identification (also referred to as an "object") for a destination device or user in connection with outgoing CE (e.g., CE that are being sent from a particular device). The CE identifier may represent a unique ID (also referred to as an "object") for a source device or user in connection with incoming CE (e.g., CE that are received by a particular device 110). The CE identifier (object) may represent a phone number, an email address, an individual/business name, and/or any other unique identifier of a source/destination device, individual, group, business and the like. The identifying operation occurs each time a CE is initiated and/or terminated, thereby identifying the CE identifier associated with each communications event for a device.

At 306, the processor adds the CE identifier to the CE ID log 230 (FIG. 2B) when the CE identifier is not already on the CE ID log 230. When the CE identifier is already on the CE ID log 230, the processor increments the count of communications events associated with the current CE identifier identified at 304.

At 308, the processor determines whether the count of CE identifiers incremented at 306 has reached a threshold indicating that a select number of communications events are associated with a common CE identifier. The processor determines when a single/common CE identifier appears on the list multiple times (e.g., 3-5 times). The processor may utilize different predetermined numbers or thresholds corresponding to the number of times that a common CE identifier should appear based on the type of communications event. The threshold may be set automatically or may be set by the user. For example, the user may enter a threshold indicating that when the user calls (or receives calls from) any individual three times, then the user desires to have that person added to their contacts. The threshold may be associated with a select type(s) of CE, for example only phone calls, only text messages, only email and text messages, etc. Alternatively, the threshold may apply to any and all types of CE. For example, a user may desire to create a contact for any person/business that the user communicates with (regardless of whether by email, text, etc.) at least five times.

The processor may maintain CE identifiers on the CE ID log 230 and increment the counts 235 indefinitely until reaching the threshold. Alternatively, the processor may remove the CE identifiers from the CE ID log 230 after a set period of time or based on some other criteria. For example, the CE ID log 230 may maintain a list 232 of CE identifiers that have been identified over the past several months, or while the user (and device 110) are in a certain geographic region (e.g., on vacation, on a business trip, etc.).

The list of CE identifiers may be limited to CE received by or sent from an individual device, received by or sent from a select group of devices, received or sent in connection with a select user account, select individual user, business, department, group, association and the like. Optionally, the list of CE identifiers may be associated with multiple user accounts, such as all members of a family, all employees in a business group, organization, etc. The list of CE identifiers may correspond to a select period of time, such as a past month, six months, year, etc. Optionally, the list 232 of CE identifiers may not be limited in time such that all CE received or sent, that are not to or from contacts in an existing contact collection, are tracked. Optionally, the list 232 of CE identifiers may be geographically limited. For example, the list 232 of CE identifiers may only maintain CE identifiers for CE sources/destinations that are within a predetermined geographic limit (e.g., country, state, city, county, neighborhood, etc.).

At 308, the processor determines whether the count for the current CE identifier equals or is greater than the select number or threshold. When the count of CE with a common CE identifier exceeds the threshold/select number, this is taken as an indication that the user may desire to create a contact in connection with the source/destination of the CE. When a contact already exists in connection with the source/destination of the CE, the recent CE may represent a potential source of new information with which to update an existing contact.

When the count of CE with the common CE identifier does not equal or exceed the select number/threshold, flow returns to 302, where the processor waits for the next communications event to track. When the count of CE with the common CE identifier equals or exceeds the select number/threshold, flow moves to 310.

At 310, the processor prompts the user with the option to update a contact associated with the common CE identifier. When no contact exists in the user's contact account or contact collection for the CE identifier, the prompt at 310 represents an inquiry as to whether the user desires to create and add a new contact to the contact collection. The processor may present an update-contact option, as a pop-up window through a user interface of the device, to perform at least one of generate a new contact or update an existing contact based on the determining. For example, the processor may present an update-contact option, as a pop-up window through the user interface of the device, to perform the contact update. As another example, the processor may present a temporary contact option, as a pop-up window through the user interface of the device, to designate the new or existing contact as a temporary contact.

Optionally, when a contact already exists in the user's contact account for the CE identifier, the processor may end at 310 without prompting the user for anything. Optionally, when a contact already exists in the user's contact account for the CE identifier, the processor may only prompt the user at 310 to update the existing contact if the existing contact has an empty contact field (e.g., email address, phone number, physical address) and the communications content includes a contact item that could potentially fill the empty contact field. For example, the user's existing contact may have a name and phone number, but no email address. When a communications event is tracked that includes an email address for the existing contact, at 310 the processor may prompt the user to determine whether the user desires to add the email address to the existing contact.

At 310, the user may enter an indication to update a contact in various manners, such as before, during or after the communications event, by selecting at least one of: an input or icon of a user interface of the device; entering a voice command; holding down a contact update button for a predetermined period of time longer than a period of time associated with starting or ending a communications event; and/or entering a predetermined non-touch gesture at the user interface associated with designation of the temporary content. At 310, the user may enter an indication that the contact update is to add a contact as a temporary contact or a permanent contact.

At 312, the processor determines whether an input has been received indicating that the user has chosen to perform a contact update (e.g., to add a new temporary or permanent contact, modify an existing contact, change a temporary contact to permanent, change a permanent contact to temporary, etc.). If so, flow moves to 314. If not, flow returns to 302.

At 314, the processor performs a contact update based on the user input/instruction received at 310/312 and the determining operation at 308. The contact update utilizes one or more content elements 240 from at least one of the communications events associated with the common CE identifier to at least one of generate a new contact or update an existing contact. For example, the processor may generate, as the contact update, a temporary contact on a device based on the content of the communications events associated with the common CE identifier. To perform a contact update, the processor may analyze the content to identify at least one of a telephone number, email address, home address, business address, or name associated with the at least one of the source or destination of the corresponding communications event.

At 316, the processor may also determine whether a temporary contact in the user contact account should be automatically deleted. For example, the processor may delete a temporary contact after an occurrence of an indicator. For example, the indicator may represent at least one of expiration of a select amount of time or a predetermined amount of time passing without using the temporary contact. The processor may further comprise storing the content in a local storage medium local to the device; and deleting the temporary content, from the local storage medium, based on an indicator. The indicator may include a lifetime marker, where the processor deletes the temporary contact, from the local storage medium, after expiration of the lifetime marker. The operation at 316 may be omitted and temporary contacts may be deleted in a different manner as discussed herein, such as when a contact is in-active (e.g., un-used) for a select time window.

Figure 4:
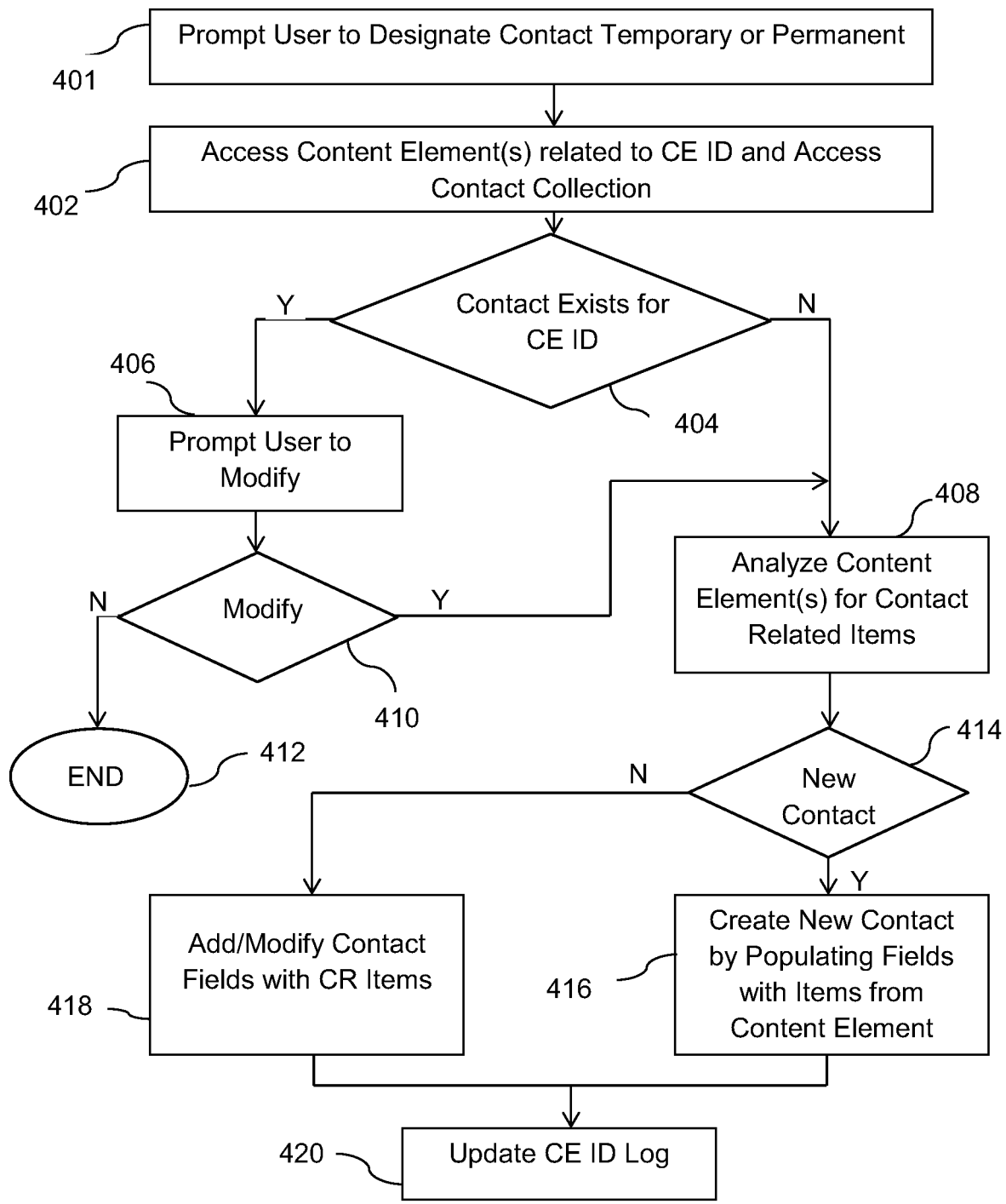
FIG. 4 illustrates a more detailed process which identifies contact related items from content elements and based thereon creates new contacts and/or modifies existing contacts, that may be carried out in accordance with embodiments herein.

FIG. 4 illustrates a more detailed process that may be carried out at 314 (FIG. 3) in accordance with embodiments. The process of FIG. 4 identifies contact related items from content elements 240 (FIG. 2B) and based thereon creates new contacts and/or modifies existing contacts. The operations of FIG. 4 are carried out by one or more processors 204 of the device 110 in response to execution of program instructions, such as in the CM application 224, and/or other applications stored in the local storage medium 206. Additionally or alternatively, the operations of FIG. 4 may be carried out by the processors within one or more servers 112 in response to instructions in memory 104.

At 402, the processor accesses one or more content elements 240 related to a current or select CE identifier. At 402, the processor also accesses the user's contact account or contact collection 270.

At 404, the processor determines whether the contact collection 270 already includes a contact associated with the CE identifier for which the update is desired. For example, when the CE identifier represents an email address, the email addresses within the contact collection 270 are searched for a match. As other examples, when the CE identifier represents a phone number, name, addresses, text message address and the like, the processor searches through the corresponding fields within the contacts of the contact collection 270 for a match. When a contact already exists and is identified as a match, the processor also determines whether any fields within the existing contact are empty.

When a contact already exists that is associated with the CE identifier, flow branches to 406. Otherwise, flow branches to 408.

At 406, the user is informed, such as through a pop-up window on the user interface of the device 110, that the CE identifier corresponds to an existing contact. At 406, the user is prompted, through the user interface of the device 110, to indicate whether the user desires to update the existing contact. The prompt at 406 may provide the user with additional information through the user interface regarding the information within the existing contact to enable the user to determine whether he, she desires to update the existing contact.

At 410, the processor determines whether the user has entered an input indicating a desire to modify an existing contact. When the user chooses to not modify the existing contact, flow branches to 412 where the process ends. When the user chooses to modify the existing contact, flow branches to 408.

At 408, the processor analyzes the one or more content elements 240 that are associated with the CE identifier (as indicated by the CE ID log 230). The content elements 240 are analyzed to identify contact related items therein. For example, when the content element 240 represents an email message 244, the method analyzes the text within the body of the email message 244 for contact related items. For example, the closing signature block and subject line may be analyzed to identify an individual's name, business name, address, telephone number, email address, website and the like. The header information associated with the email message 244 (e.g. the email address to which the message is directed or from which the message was sent) is also analyzed for names and email addresses. As another example, when the content element 240 represents a text message 242, the number to which the message is sent, or from which the message was received, is analyzed for contact related items (e.g. a phone number). The body of the text message 242 may also be analyzed for contact related items. When the content element 240 represents a phone log 246, the sender/recipient phone number may represent one type of contact related item identified at 408.

At 414, the processor branches based upon whether the CE identifier corresponds to a new contact or an existing contact. When the CE identifier is for a new contact, flow moves to 416. Otherwise, flow moves to 418.

At 416, a new contact is created and the fields therein are populated with the contact related items identified within the content element 240 at 408. Optionally, at 416, the user may be afforded the opportunity to confirm, edit, delete or otherwise manage the newly created contact.

At 418, the contact related items identified at 408 are added to the corresponding fields within the existing contact. When an existing contact includes different information within one or more of the contact fields, the new contact related items (determined at 408) are written over (or appended to) the old/existing contact information. For example, when a new email address or new phone number is identified at 408 for an existing contact, the new email address or phone number may be written over the old email address and phone number. Alternatively or additionally, one or both of the new email address and phone number may be added as an alternative email address and/or an alternative phone number, while retaining the old email address and phone number.

At 420, the processor updates the CE identifier log 230 to indicate that the CE identifier has been processed. For example, the CE identifier may be deleted from the CD ID log 230.

Figure 5:
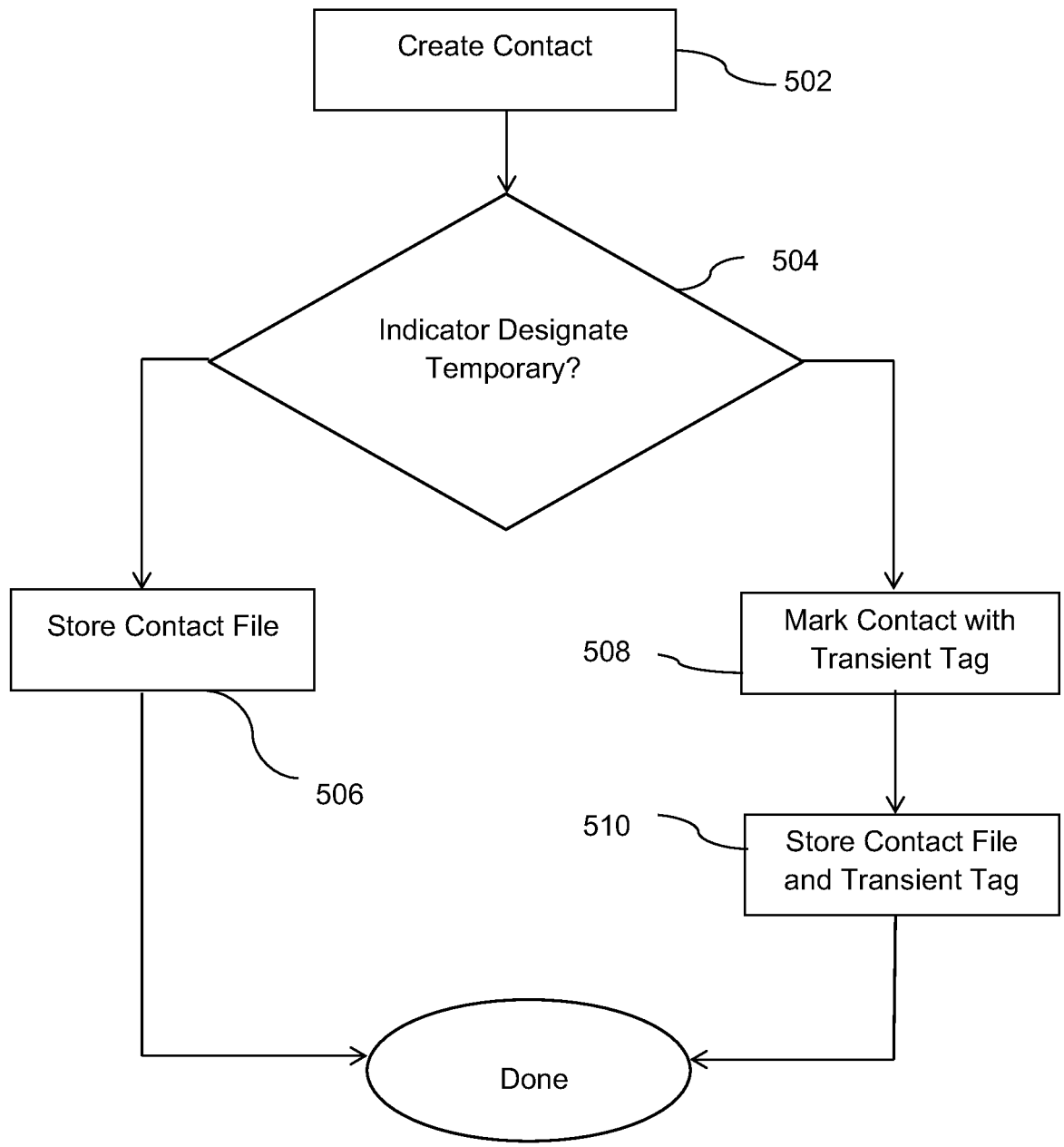
FIG. 5 illustrates a process carried out in accordance with embodiments for marking contacts as temporary in accordance with embodiments herein.

FIG. 5 illustrates a process carried out in accordance with embodiments for marking contacts as temporary in accordance with embodiments herein. The operations of FIG. 5 are carried out by one or more processors 204 of the mobile device 110 (and/or by processor(s) of the server 112) in response to execution of program instructions, such as in the TCM application 224, and/or other applications stored in the local storage medium 206.

At 502, a contact is created, such as by creating a contact file associated with an individual, business, etc. The fields of the contact are populated with the contact related items collected from the content element(s).

At 504, the processor determines whether a term indicator 222 (FIG. 2A) has been received through a user interface of the mobile device 110. The term indicator 222 designates the contact to represent a temporary contact. The term indicator 222 represents a transient tag that may include a "lifetime marker" of a temporary contact element in various manners. The term indicator 222 may be entered before, during or after collection of the contact.

At 504, when a term indicator 222 is received, flow moves to 508. When a term indicator 222 is not received, flow moves to 506. At 506, the contact is stored in the local storage medium 206 as non-temporary contact (also referred to as a contact file).

Returning to 504, when a term indicator 222 is received, flow moves to 508. At 508, the contact or contact file is marked as a temporary contact with a transient tag. For example, the term indicator 222 may represent a transient tag that includes a time-based or temporal lifetime marker. The transient tag may be stored in the local storage medium 206 in a linked manner with the corresponding temporary contact file(s). The transient tag and contact file may be linked in various manners. For example, the transient tag may be stored in a field in a data file containing the contact file. Alternatively or additionally, the transient tag may be appended as meta-data to the contact file.

For example, the temporal lifetime marker may designate an expiration date, such that, after expiration of the lifetime marker, the content element is to be deleted from the mobile device 110. Additionally or alternatively, the term indicator 222 may indicate a time window, in which the user has to communicate with the contact, otherwise the contact will be deleted. For example, the term indicator may be 3 months, 6 months, 1 year. If the device 110 does not enter a communications event involving the contact within the time window, the temporary contact is deleted. For example, the temporary contact may include a "last use" field indicating the last time that the device 110 entered a communications event with the contact. When the "last use" is older than the term indicator (e.g., older than the time window), then the device 110 deletes the temporary contact. A communications event may represent sending or receiving an email or text message, making or receiving a phone call and the like. By way of example, each time a communications event occurs that is associated with a temporary contact, the device 110 updates the "last use" field of the contact.

At 510, the contact, and the term indicator 222, are stored in the local storage medium 206 as a temporary contact file(s). The operations at 502-510 are repeated each time the device 110 performs a communications event.

In accordance with at least one embodiment herein, to the extent that devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method, comprising:
    utilizing a transceiver of the device to send and receive communications events to and from destination and source devices, respectively;
    under control of a processor of a device configured with executable instructions,
    tracking communications event (CE) identifiers associated with the communications events;
    storing, in memory of the device, a count of the communications events associated with common CE identifiers;
    determining whether the count of the communications events associated with one of the common CE identifiers reaches a select number, the select number being two or more communications events;
    responsive to the determining, automatically creating and storing, in the memory on the device, a temporary contact file, the creating and storing including:
        automatically populating fields of the the temporary contact file with contact related items within at least one of the communications events associated with the one of the common CE identifiers; and
        creating and storing, in the memory, a term indicator associated with the temporary contact file; and
    deleting the temporary contact file automatically, from the memory, responsive to an occurrence of the term indicator.

2. The method of claim 1, further comprising, responsive to the determining, presenting an update-contact option, through a user interface of the device, to create the temporary contact file, the temporary contact file automatically created and stored in response to a user input to the update-contact option.

3. The method of claim 1, further comprising, responsive to the determining, presenting an update-contact option, through a user interface of the device, to modify an existing temporary contact the method further comprising updating the temporary contact file in response to a user input to the update-contact option.

4. The method of claim 1, wherein the CE identifiers indicate the source device for the communications events received by the device or the destination device for the communications events sent from the device.

5. The method of claim 1, wherein the term indicator includes a lifetime marker, the method further comprising deleting the temporary contact file, from the memory of the device, after expiration of the lifetime marker.

6. The method of claim 1, wherein the content is content selected from the group consisting of incoming communications content received by the device and outgoing communications content sent from the device.

7. The method of claim 1, further comprising analyzing the content to identify the contact related items selected from the group consisting of a telephone number, email address, home address, business address, and name associated with the corresponding communications event.

8. The method of claim 1, wherein the select number of communications events associated with a common CE identifier represent a threshold equal to or greater than three.

9. The method of claim 1,
wherein the term indicator represents a predetermined amount of time passing without using the temporary contact.

10. A device, comprising:
a transceiver configured to send and receive communications events to and from destination and source devices, respectively;
a processor;
a user interface generated via the processor;
memory configured to store program instructions accessible by the processor;
wherein, responsive to execution of the program instructions, the processor configured to:
track communications event (CE) identifiers associated with the communications events;
store, in the memory of the device, a count of the communications events associated with common CE identifiers;
determine whether the count of the communications events associated with one of the common CE identifiers reaches a select number, wherein the select number of communications is a threshold equal to or greater than two;
responsive to the determine operation, automatically create and store, in the memory on the device, a temporary contact file, the create and store operations including to:
automatically populate fields of
the temporary contact file with contact related items from at least one of the communications events associated with the one of the common CE identifiers;
create and store, in the memory, a term indicator associated with the temporary contact file; and
delete the temporary contact file automatically, from the memory, responsive to an occurrence of the term indicator.

11. The device of claim 10, wherein the memory is configured to store a CE identification log including the CE identifiers and the count of the number of communications events that are tracked that are associated with the corresponding CE identifiers.

12. The device of claim 10, wherein the CE identifiers indicate the source device for the communications events received by the device and the destination device for the communications events sent from the device.

13. The device of claim 10, wherein, responsive to the determine operation, the user interface configured to present a temporary contact option to designate a contact as the temporary contact, the processor configured to automatically create and store the temporary contact file in response to a user input to the update-contact option.

14. The device of claim 10, wherein the term indicator represents a predetermined amount of time passing without using the temporary contact.

15. The device of claim 10, wherein the term indicator represents a predetermined geographical limitation.

* * * * *